Jan. 25, 1927.
W. B. McLAUGHLIN
METHOD OF CONCENTRATING FLUIDS
Filed Jan. 17, 1923
1,615,287
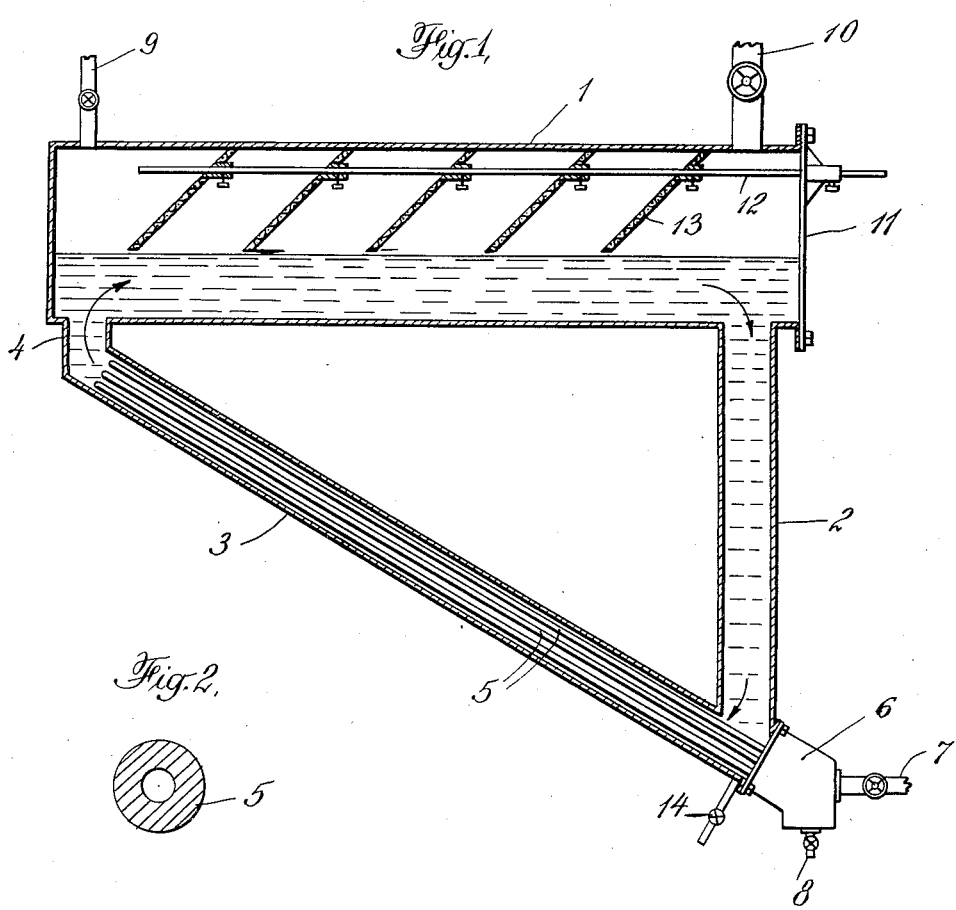
INVENTOR
Wharton B. McLaughlin Patented Jan. 25, 1927.

1,615,287

UNITED STATES PATENT OFFICE.

WHORTON B. McLAUGHLIN, OF NEW YORK, N. Y.; CELIA BROWN McLAUGHLIN ADMINISTRATRIX OF THE SAID WHARTON B. McLAUGHLIN, DECEASED.

METHOD OF CONCENTRATING FLUIDS.

Application filed January 17, 1923. Serial No. 613,314.

This invention relates to the art of vacuum concentration and especially applies to those food products whose flavor is altered by concentration in vacuo.

The object of my invention is to furnish a method which will permit of the concentration of such food products as milk, fruit and cane juices without loss of flavor so that when the amount of water taken out be returned to the concentrate the original fluid will in exactness be reproduced.

It is well known that extremes of temperature, both heat and cold, alter these products in such a manner as to sharply differentiate the products subjected to extreme heat or cold from the natural product. Applicant accomplishes the object of his invention through the aid of the apparatus herein described, wherein heat is used as the concentrating agent, but the temperature of the heating coil is maintained below the point at which chemical alteration takes place.

The change of flavor ordinarily observed in vacuum concentration is due to the sharp impact of particles of the substance upon the heating surface, which, while the temperature of the boiling liquid may be below that at which chemical change takes place, is above the point at which chemical alteration occurs. This is manifested by a tendency of the heating surfaces in ordinary vacuum devices to foul.

Figure 2 in the drawing illustrates a part of the means which applicant uses to maintain a low temperature on the surface in contact with the fluid undergoing evaporation. Owing to the thickness of the wall of the heating pipe 5, the heat-absorbing surface of the inside of the tube is markedly less than the heat radiating surface on the outside of the tube. This, in conjunction with the rapid circulation caused by the peculiar construction of the apparatus, insures that in the passage of heat from the heating agent to the substance undergoing concentration, the choke in the passage of the heat through the tube walls is in the interior surface of the pipe, and the exterior or the one in contact with the substance undergoing concentration, will be cooled very much below the temperature of the heating agent, and to a point where no chemical change will take place.

I have discovered that if the temperature of the heating surface in contact with the substance undergoing concentration be only slightly above, at or below the temperature at which change of flavor takes place on heating, substances such as milk, fruit or cane juices can be concentrated in vacuo without loss of flavor.

It is also well known that in the transfer of heat from a pipe containing steam to a fluid surrounding it the amount of heat transferred per unit of time increases with the increase in velocity of the fluid surrounding the pipe.

I will now describe my preferred method of concentration although I do not limit myself to it. In the accompanying drawing, which diagrammatically illustrates the apparatus, Fig. 1 is a section in elevation, Fig. 2 is a cross-section of one of the heating pipes (5).

This apparatus consists essentially of the drum (1) designed to hold the major part of the fluid to be concentrated, the descending tubular leg (2), the ascending tubular leg (3) connecting with the drum (1) as shown at (4). In the leg (3) are placed the heating pipes (5) fed with steam from the header, (6) and having means not shown to prevent their becoming air bound. The header (6) is supplied with steam by the pipe (7). The condensed steam escapes from the drip pipe (8), both pipes having proper valves to regulate the flow. The feed pipe (9) properly controlled by a valve serves to bring material to be concentrated into the apparatus. The pipe (10) connects through a condenser, not shown, to an air pump, not shown, which serve to produce and maintain the desired vacuum in the apparatus. Proper vacuum and water gauges are assumed but not shown. The pipe (14) controlled by a suitable valve, serves to withdraw fluid from the apparatus at the end of operation. Attached to the drum head (11) supported by suitable frames are the mesh foam breakers (13), which serve to prevent the passage of foam into the pipe (10). The head (11) can be easily removed for cleaning.

Fig. 2 shows a cross-section of one of the heating pipes (5) in which the thickness of the wall increases the ratio of the heat absorbing surface on the inside of the pipe to the heat radiating surface on the outside of the pipe so that under the conditions existing in the apparatus (the rapid flow of the material to be concentrated over the heating surface) the choke in the heat transfer system is at the heat absorbing surface. It is claimed that in every vacuum concentrating device heretofore constructed the reverse has been true; that is, that the choke was at the heat radiating surface.

In operating my device the apparatus is filled with the fluid to be concentrated until its level is just below and out of contact with the foam breakers (13). The steam pressure in the pipes in the header (6) is regulated and controlled by the valve in the pipe. After the proper vacuum has been obtained this valve in the steam pipe is slowly opened. The circulation of the fluid in the apparatus immediately begins and follows the direction of the arrows in the drawing. The vapors formed pass off through the pipe (10) into the condenser and air pump. At the end of operation the vacuum is relieved and the concentrated fluid drawn off through the pipe (14).

By my process, there is produced a fluid concentrate, which has not been altered in its non-volatile constituents either in their proportion to each other or in their chemical characteristics, the colloids remaining in colloidal solution, the sugars are not caramelized, and upon dilution with water, the product with the exception of the loss of a small proportion of volatile flavoring matter, is absolutely indistinguishable from the natural organic food product in color, taste, and chemical characteristics.

The concentrates of fruit juices produced by this process are stable, and remain indefinitely without chemical alternation under all ordinary conditions. There is no necessity for sterilization or artificial perservatives.

Having now described my invention, that which I claim is:

1. The method of concentrating fluids at low temperatures with heat derived from a fluid at substantially greater temperatures which consists in providing a heat-transmitting surface of large area, and a heat-absorbing surface of much smaller area, exposing said larger area to the fluid to be evaporated and said smaller area to the higher temperature fluid and transmitting the heat from one surface to the other.

2. The method of utilizing steam at pressures equal to or greater than atmospheric pressure for effecting evaporation at sub-atmospheric temperatures and pressures which consists in providing a heat-transmitting surface of larger area in contact with the fluid to be concentrated and a heat-absorbing surface of much smaller area in contact with the steam and tranferring heat from the absorbing surface to the transmitting surface.

Signed at the city of New York in the county of New York and State of New York this 17th day of January A. D. 1923.

WHORTON B. McLAUGHLIN.